United States Patent

Sato et al.

[11] Patent Number: 5,790,184
[45] Date of Patent: Aug. 4, 1998

[54] IMAGE DISPLAY SYSTEM

[75] Inventors: Seizi Sato, Kanagawa; Yoshiki Shirochi, Chiba; Naoki Kamaya, Tokyo, all of Japan

[73] Assignee: Sony Corporation, Tokyo, Japan

[21] Appl. No.: 50,823

[22] Filed: Apr. 21, 1993

[30] Foreign Application Priority Data

Apr. 23, 1992 [JP] Japan .................... 4-129279

[51] Int. Cl.⁶ ............................................ H04N 7/18
[52] U.S. Cl. ............................................ 348/53; 348/42
[58] Field of Search ........................... 358/88, 92, 105; 348/42, 43, 44, 46, 51, 52, 53, 56, 39, 115; 351/153, 158; H04N 7/18

[56] References Cited

U.S. PATENT DOCUMENTS

| | | |
|---|---|---|
| 4,021,846 | 5/1977 | Roese . |
| 4,115,995 | 9/1978 | Brien .................... 58/50 |
| 4,257,691 | 3/1981 | Brooks ................. 351/158 |
| 4,482,326 | 11/1984 | Witt ...................... 348/115 |
| 4,562,463 | 12/1985 | Lipton ................... 348/42 |
| 4,933,755 | 6/1990 | Dahl et al. ............. 348/42 |
| 4,952,024 | 8/1990 | Gale ...................... 348/53 |
| 4,967,268 | 10/1990 | Lipton et al. .......... 358/92 |
| 4,985,762 | 1/1991 | Smith .................... 348/39 |
| 5,034,809 | 7/1991 | Katoh .................... 348/42 |
| 5,276,471 | 1/1994 | Yamauchi et al. .... 351/153 |
| 5,357,277 | 10/1994 | Nakayoshi et al. ... 348/53 |

FOREIGN PATENT DOCUMENTS 2254513  10/1992  United Kingdom .

Primary Examiner—Richard Lee
Attorney, Agent, or Firm—Jay H. Maioli

[57] ABSTRACT

An image display system stereoscopically reproduces a visual scene and includes an image display unit with a pair of LCD panels each starting its operation in response to a start pulse received every vertical field of an input video signal; a source of input video signals representing right and left stereoscopic video images every field; a circuit for generating right and left start pulses, which are mutually in an opposite-phase relationship, in synchronism with the arrival of the right and left video images; and a driver for driving the pair of LCD panels by the right and left start pulses. The image display unit is shaped into a virtual viewer incorporated in a ski-goggle type frame which is adapted to be worn on a user's head. The video images displayed on the two LCD panels are refreshed alternately to obtain a flickerless image without the necessity of employing any particular circuit or terminal.

7 Claims, 8 Drawing Sheets

F I G. 4A
INPUT STEREO
VIDEO SIGNAL
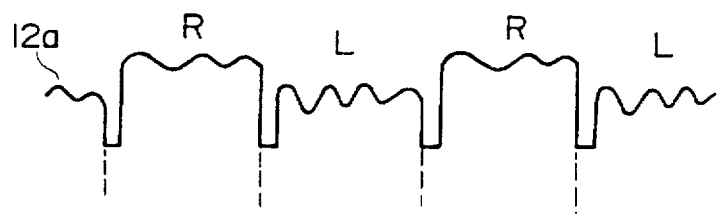
F I G. 4B
E/O SIGNAL
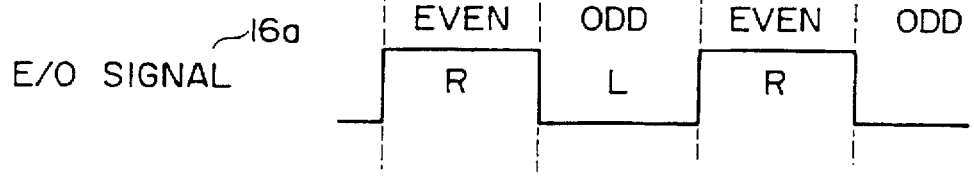
F I G. 4C
VD SIGNAL
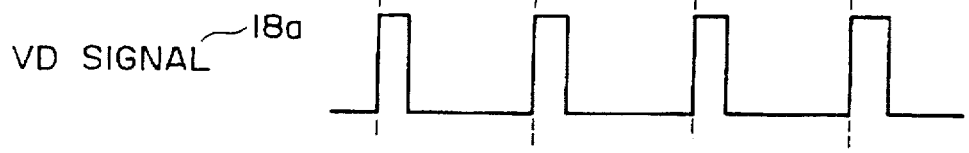
F I G. 4D
R-V START
SIGNAL
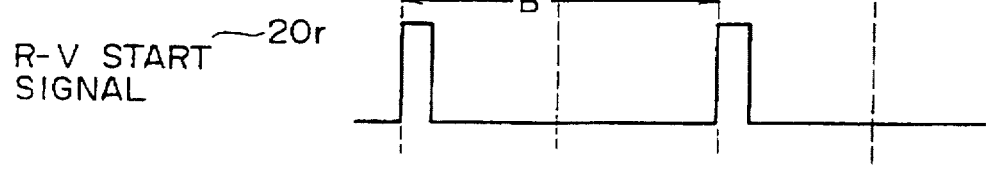
F I G. 4E
21r
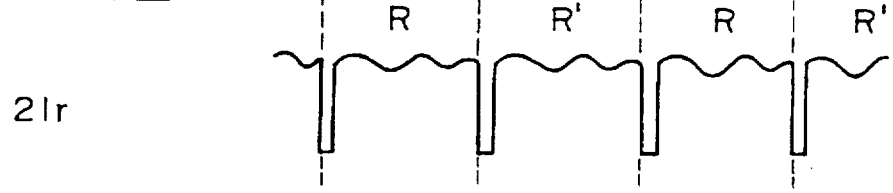
F I G. 4F
L-V START
SIGNAL
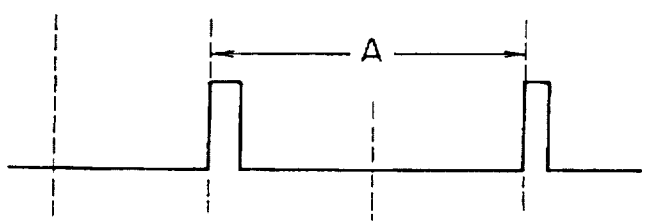
F I G. 4G
21l
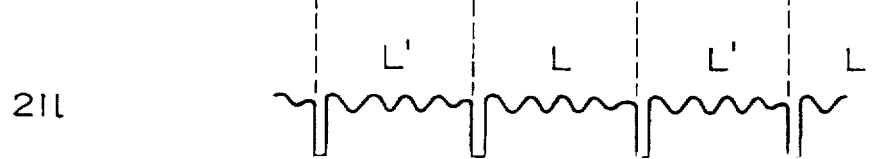

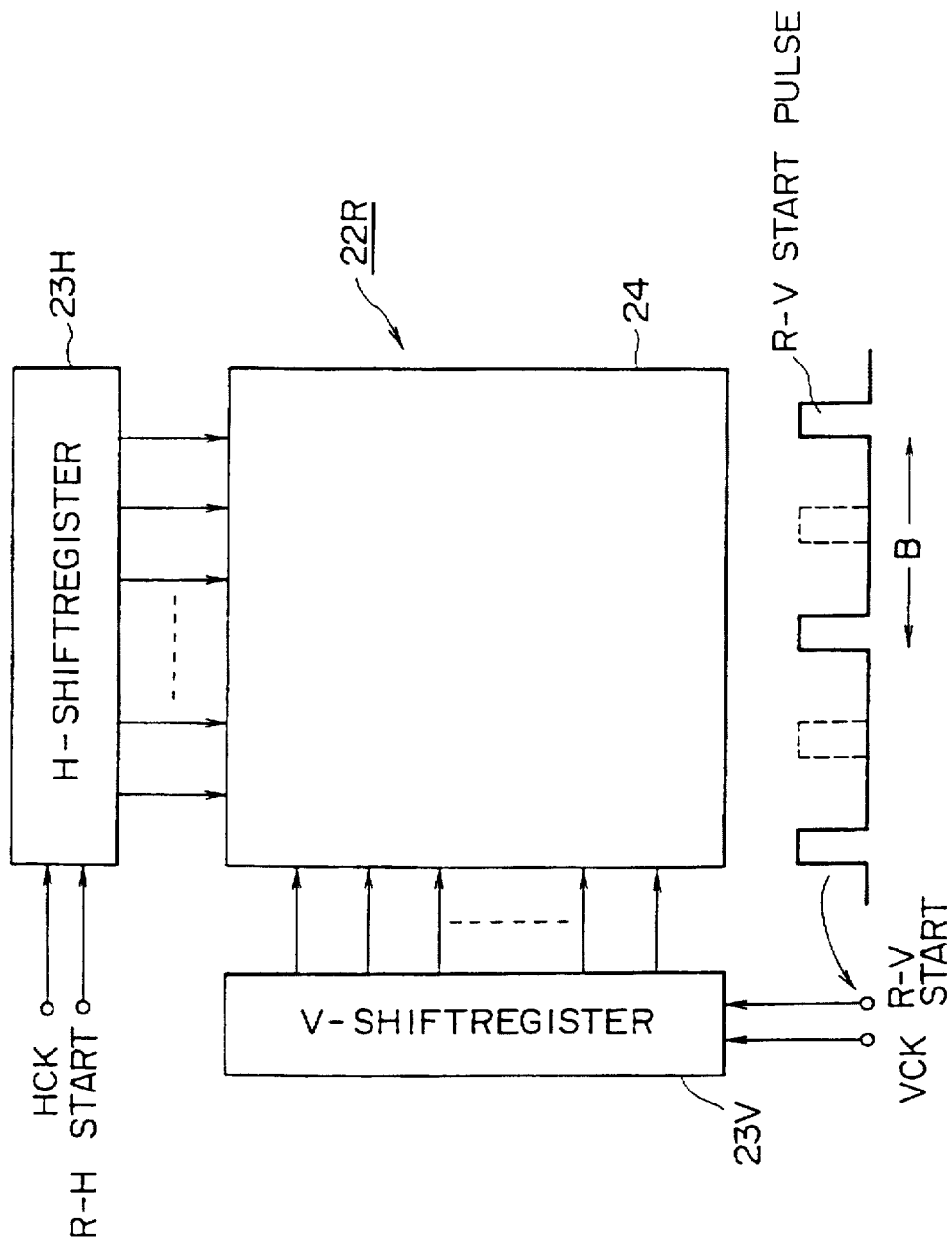

IMAGE DISPLAY SYSTEM

BACKGROUND OF THE INVENTION

1. Field of the Invention

The present invention relates to a stereoscopically visible image display system adapted for prevention of flicker and, more particularly, to improvements in a stereoscopic display unit of ski goggle-like contraption employing a pair of liquid crystal display panels.

2. Description of the Related Art

There are known image systems with ski-goggle type image display units each using a TV liquid crystal display device, as disclosed in U.S. Pat. Nos. 5,129,716, 5,106,179 and so forth. However, none of such conventional systems is contrived for solving the problem of flicker that occurs in a TV display device.

Relative to the stereoscopic image display system of the type mentioned, there is a prior invention applied by the same assignee and disclosed in U.S. patent application Ser. No. 951,854 (filed Sep. 28, 1992). In the display system according to such prior invention, a switching signal synchronized with a vertical sync signal is produced with regard to liquid crystal display (LCD) panels which are prepared for left and right eyes of a user respectively and are each furnished with a write terminal for writing a video signal and a hold terminal for holding a memory effect, and an immediately preceding image is displayed on the left and right LCD panels alternately in conformity with such switching signal so that a flickerless stereoscopic video image can be obtained.

However, in forming a stereoscopic image by means of LCD panels in the prior invention described above, each of the LCD panels needs to have write and hold terminals, and therefore it is impossible to employ any general LCD panel without such write and hold terminals.

Consequently, there still exists a problem in accomplishing a desired structure where a flickerless stereoscopic image can be obtained even by the use of ordinary LCD panels without write and hold terminals.

OBJECT AND SUMMARY OF THE INVENTION

It is an object of the present invention to provide an improved stereoscopic image display system which is capable of realizing satisfactory display of flickerless stereoscopic video images even by the use of general LCD panels having none of write and hold terminals.

In the image display system of the present invention, two LCD panels are so disposed individually as to be seen only with a left eye and a right eye respectively, and stereoscopic image signals corresponding respectively to the left and right eyes are displayed every field of a video signal individually on the left-eye and right-eye LCD panels. A vertical (V) start signal synchronized with a vertical sync signal is supplied alternately to the two LCD panels for the purpose of refreshing the image immediately before the arrival of the stereoscopic image signal corresponding to the video image to be seen with the left and right eyes every field. Another feature of the present invention resides in that the image display unit in the system is shaped into a ski goggle type.

According to one aspect of the invention, there is provided an image display system for stereoscopic reproduction of visual scene, comprising an image display unit having a pair of LCD panels each starting the operation thereof in response to a start pulse received every vertical field of an input video signal; a source for outputting right and left stereoscopic video images every field; a means for generating right and left pulses, which are mutually in an opposite-phase relationship, in synchronism with the arrival of the right and left video images; and a means for driving the pair of LCD panels by the right and left start pulses respectively.

According to another aspect of the invention, the image display unit is a virtual viewer incorporated in a ski-goggle type frame which is adapted to be worn on a user's head.

In this image display system, the images on the left and right LCD panels are sequentially reset by the V start signal synchronized with the vertical sync signal, so that even if the LCD pulses have none of write and hold terminals, flickerless stereoscopic images can still be obtained to eventually enhance the usability of the LCD panels without such terminals.

The above and other features and advantages of the present invention will become apparent from the following description which will be given with reference to the illustrative accompanying drawings.

BRIEF DESCRIPTION OF THE DRAWINGS

FIG. 4 is a timing chart of signals produced in synchronism with a vertical sync signal in the circuits of FIG. 3;

FIG. 5 is a conceptual diagram of an LCD device employed in the present invention;

DESCRIPTION OF THE PREFERRED EMBODIMENTS

Figure 1:
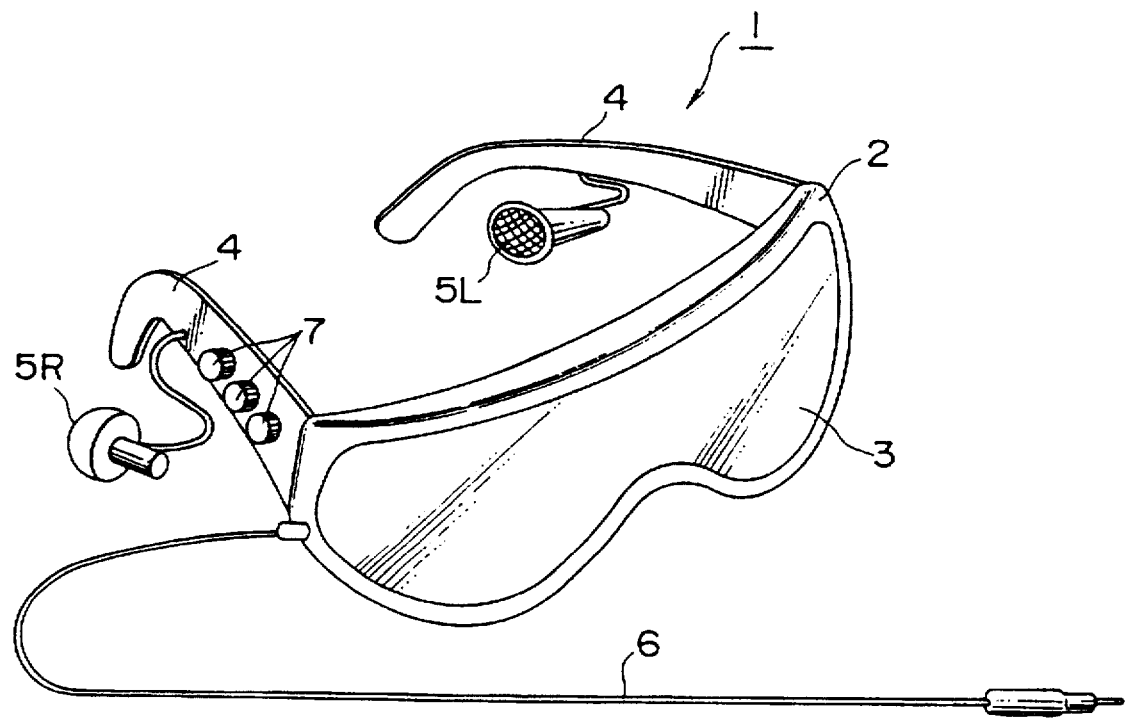
FIG. 1 is a perspective general view illustrating a ski-goggle type stereoscopic image display unit in the system of the present invention.

Hereinafter the present invention will be described in detail with reference to a preferred embodiment thereof shown in the accompanying drawings. In an image display unit 1, as illustrated in FIG. 1, a blind panel 3 composed of a half mirror or a colored glass sheet is disposed in a portion of a ski-goggle type body 2 corresponding to lenses of spectables, and earphones 5L, 5R are provided in a pair of stems 4. And a cord 6 for video signal, sound signal and a power supply is drawn out from one end of the goggle body 2.

Required circuits (not shown) are incorporated in the stems 4, and a group of buttons 7 for controlling operations in playback, fast-forward, stop and pause modes are disposed in a portion of one stem 4.

Figure 2:
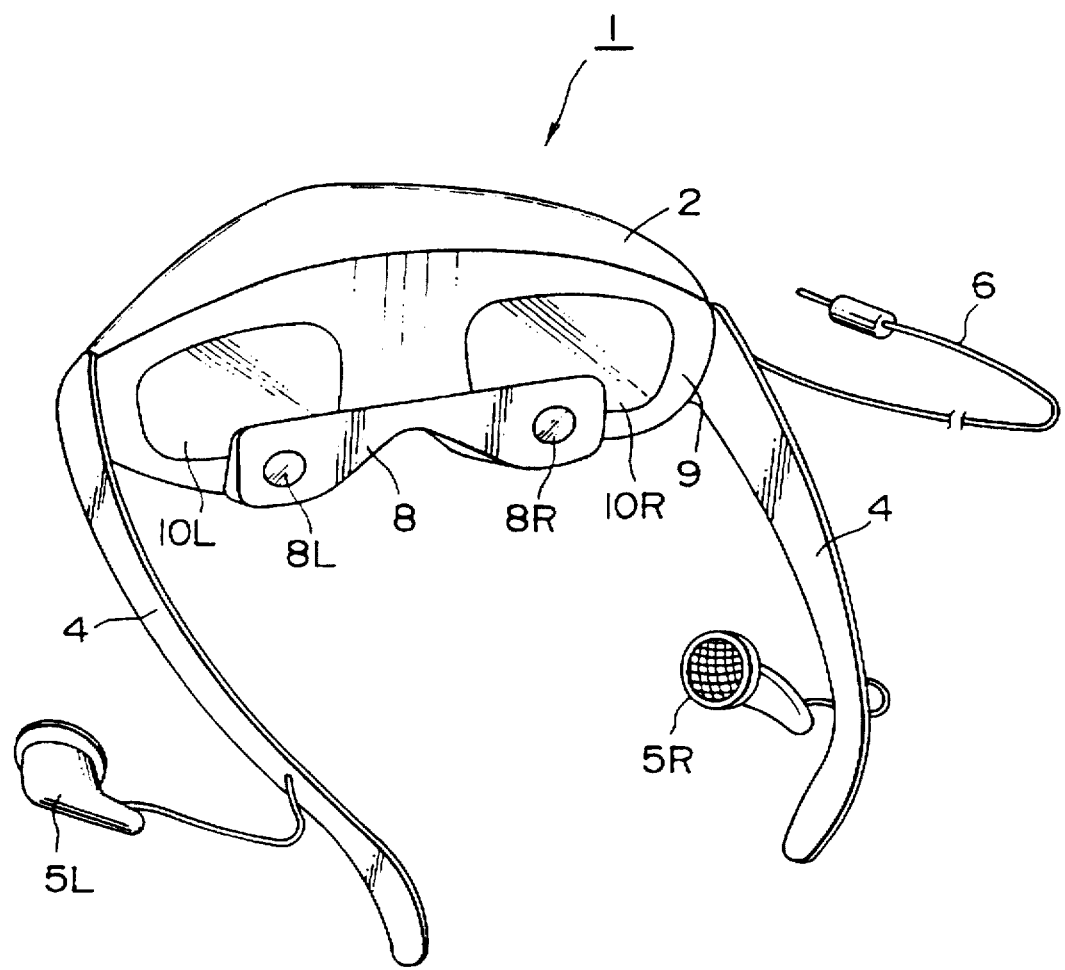
FIG. 2 is a perspective rear view of the image display unit shown in FIG. 1.

FIG. 2 is a rear view of the image display unit 1 seen from behind, wherein a frame 8 has lenses 8L, 8R for left and right eyes of a user respectively, and a back panel 9 is attached to the goggle body 2 in a manner to surround the frame 8. The back panel 9 has windows 10L, 10R so that the user can see the outside view therethrough by taking off the lenses 8L, 8R from his eyes.

In the goggle body 2, there are incorporated two LCD panels (not shown), and chevron-shaped mirrors and so forth are interposed between such LCD panels so that a stereoscopic video image can be obtained. And a V signal control circuit 11 also is incorporated in the goggle body 2 for forming a stereoscopic video image by alternately displaying the images on the two LCD panels every field.

Figure 3:
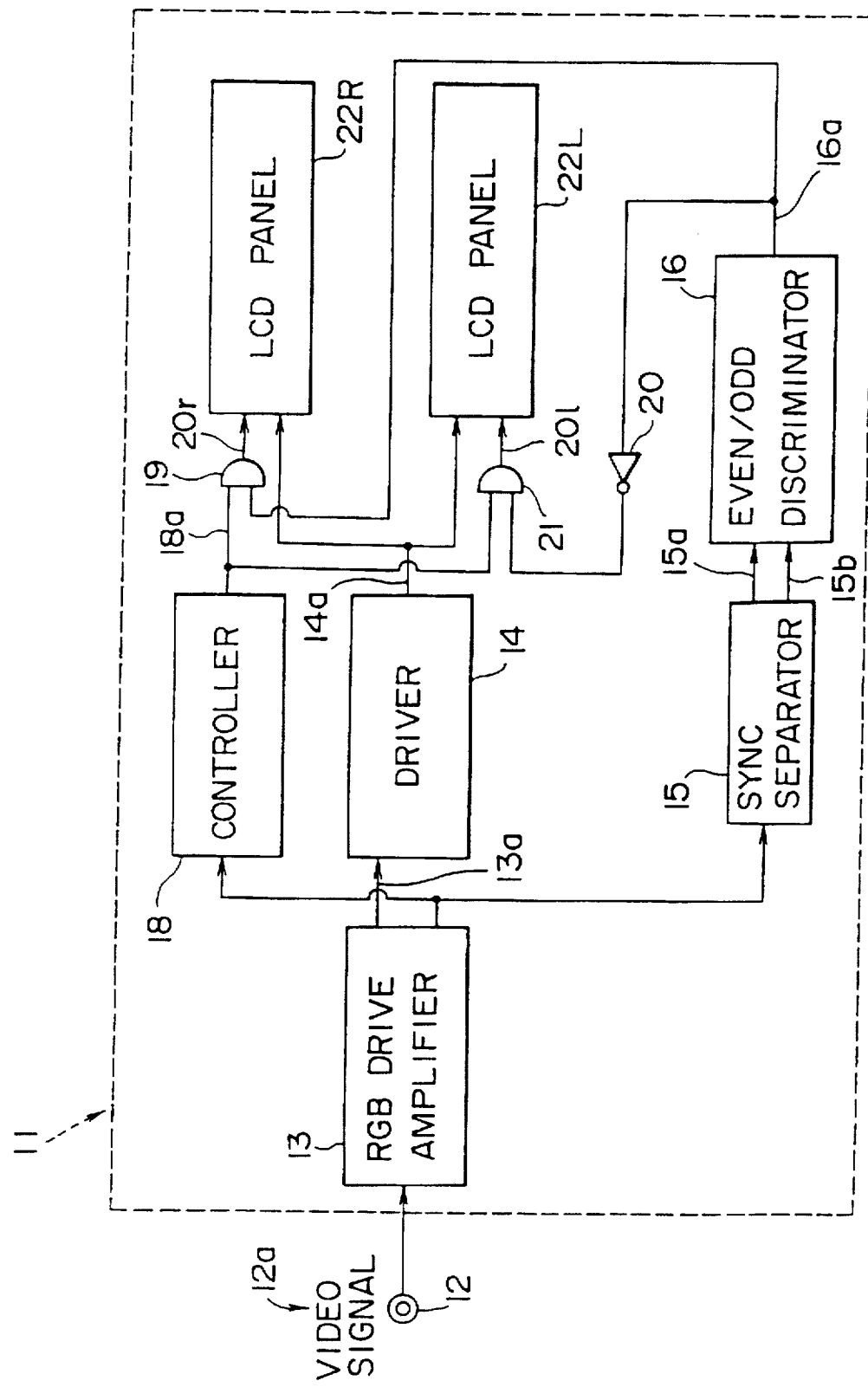
FIG. 3 is a block diagram of circuits for producing stereoscopic video images from video signals in the present invention.

In the V signal control circuit 11, as shown in FIG. 3, an input video signal 12a supplied via an input terminal 12 is supplied by an RGB drive amplifier 13, and then a video signal 13a composed of the amplified RGB components is supplied to a driver 14.

A stereoscopic image signal 14a outputted from the driver 14 is supplied to two LCD panels 22R and 22L to be thereby displayed on the panels.

Meanwhile the amplified video signal is passed through a sync signal separator 15 consisting of a slice circuit and an integrator circuit, so that there are extracted a vertical (V) sync signal 15a and a horizontal (H) sync signal 15b.

An even/odd video field discriminator 16 produces, on the basis of the V sync signal 15a and the H sync signal 15b, a rectangular-wave binary signal (hereinafter referred to as E/O signal) 16a inverted every field. The E/O signal thus produced serves as a condition for generating an R-V start signal 20r and an L-V start signal 20l which will be described later.

The video signal 13a amplified by the RGB drive amplifier 13 is supplied also to a controller 18, which then generates a pulse signal (hereinafter referred to as VD signal) 18a for each field on the basis of the vertical sync signal included in the video signal 13a. This VD signal serves as one condition for resetting the video images on the two LCD panels 22R and 22L.

When the E/O signal 16a and the VD signal 18a are both positive and have the same level, the input condition of an AND gate 19 is satisfied to generate an R-V start signal 20r, which is then inputted to the LCD panel 22R.

The video image on the LCD panel 22R is reset by the R-V start signal 20r, and a new stereoscopic video signal 14a is inputted to the LCD panel 22R so that its image can be displayed thereon.

When the VD signal 18a and a signal obtained by passing the E/O signal 16a through a 180° delay circuit or an inverter 20 are both positive and have the same level, the input condition of an AND gate 21 is satisfied to generate an L-V start signal 20l, which is then inputted to the LCD panel 22L.

The video image on the LCD panel 22L is reset by the L-V start signal 21l, and a new stereoscopic video signal 14a is inputted to the LCD panel 22L so that its image can be displayed thereon.

As described above, the R-V start signal 20r is generated in an even field, while the L-V start signal 20l is generated in an odd field, so that the LCD panels 22L and 22R can be reset alternately in synchronism with the vertical sync signal. More specifically, the images displayed on the LCD panels 22L and 22R by the video signal 12a can be alternately refreshed to consequently obtain a flickerless stereoscopic video image.

Referring now to a timing chart of FIG. 4 A–G, a description will be given with regard to the relationship between the R-V start signal 20r and the L-V start signal 20l which are generated alternately in even and odd fields synchronously with the vertical sync signal.

The E/O signal 16a is a binary signal inverted every field by the video signal 12a and becomes positive in an even field or negative in an odd field (FIG. 4 A, B).

The R-V start signal 20r is generated on the basis of the E/O signal 16a and the VD signal 18a. And the positive R-V start signal 20r is obtained when the E/O signal 16a and the VD signal 18a are both positive (FIG. 4 C, D, F).

The L-V start signal 20l is generated on the basis of the E/O signal 16a and the VD signal 18a, and becomes positive when the E/O signal 16a is negative while the VD signal 18a is positive.

The R-V start signal 20r and the L-V start signal 20l are generated alternately per field to reset the LCD panels 22L and 22R alternately, whereby a video image can be displayed in accordance with a new stereoscopic video signal 14a each time.

The two start signals 20r and 20l are generated with a time difference of one field, and the time interval (A, B) therebetween corresponds exactly to one frame of the video signal 12a.

Thus, it is possible to refresh the left and right LCD panels with one-field time difference. As shown in FIG. 4 E, G relative to the signals 21r and 21l where R, L are equivalent to R', L' respectively, such refreshing function is the same as the control achieved by the write and hold terminals having a memory effect, hence producing a stereoscopic video image.

As described above, the image display system of the present invention is capable of realizing a stereoscopic video image by displaying alternate images with a one-field time difference on the two LCD panels in response to V start signals produced on the basis of the vertical sync signal in the composite video signal, thereby dispensing with the known circuit to rewrite the images on the LCD panels and eliminating the necessity of particular terminals to refresh the LCD panels. Consequently, it becomes possible to attain a superior distinction even on general ordinary LCD panels without the necessity of employing any specific LCD panels.

FIG. 5 is a conceptual diagram of a MOS FET type active matrix display unit employed in the system of the present invention. This diagram shows the internal structure of an LCD display panel 22R, wherein an H-shift register 23H and a V-shift register 23V are connected to a display region 24. Clock signals HCK and VCK are supplied respectively to the two registers 23H and 23V, so that the LCD elements are scanned and activated in horizontal and vertical directions. When the R-V start pulse denoted by a dotted line is interrupted, the shift pulse from the V-shift register is not supplied to the display region 24, so that the video content of the preceding field is held as a residual image.

Normally in the LCD unit of the type mentioned, a vertical start pulse is supplied to the V-shift register every vertical period of a TV signal, and a horizontal start pulse is supplied to the H-shift register every horizontal period thereof, so that the LCD elements are activated by the output pulses of the registers respectively. Each of such start pulses is termed a refresh pulse or a reset pulse.

In the present invention, the driving action of the vertical start pulse is controlled in the manner mentioned above.

Figure 6:
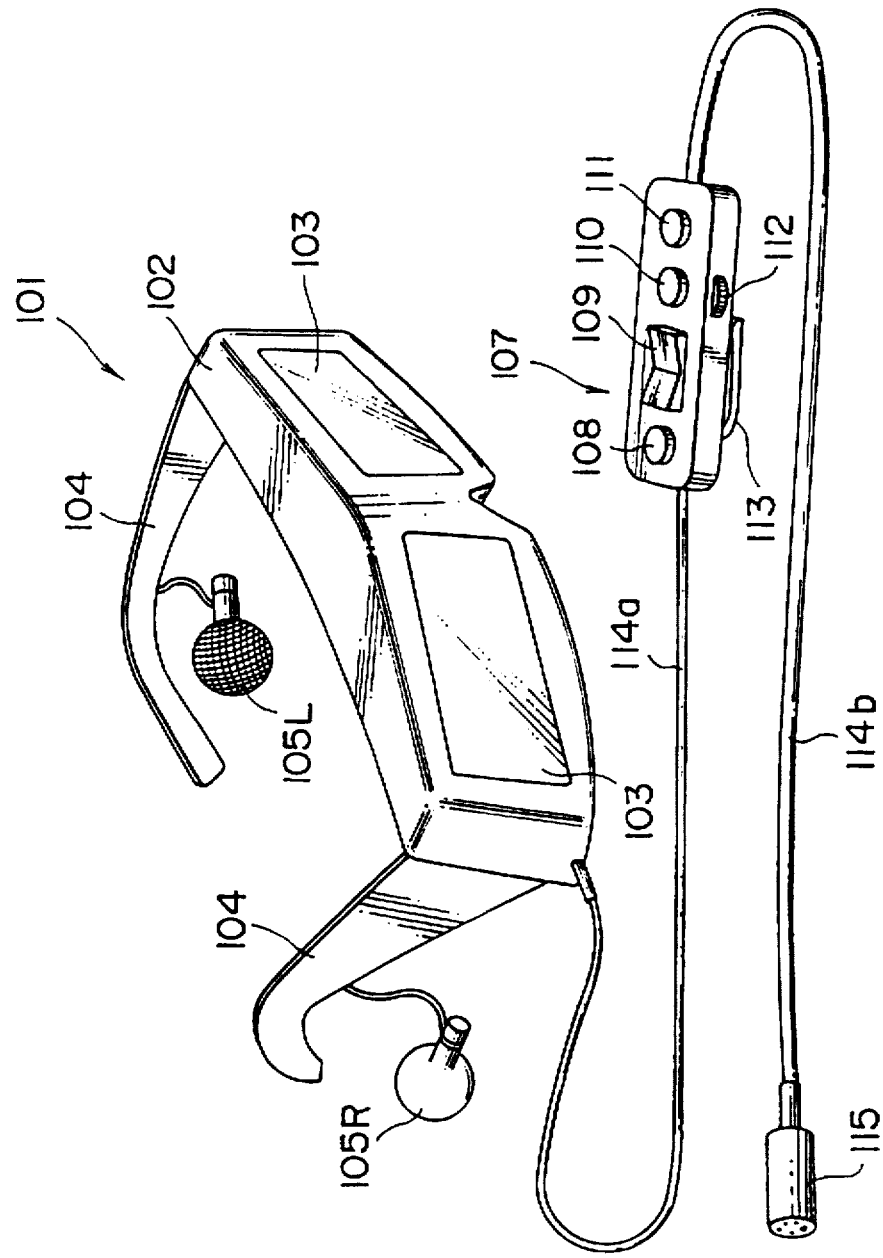
FIG. 6 is a conceptual front view of the image display unit having an additional function in the system of the present invention.

Hereinafter a modified goggle type display unit will be described with reference to FIGS. 6 through 8.

This modification, which is a second embodiment of the present invention, is so contrived that, when a user watches a displayed image, the outside view is blocked by a shield. However, if there is sensed any shock or sound derived from an abrupt motion of the user's head or some other external factor, the shield is opened automatically so that the outside view can be seen through the goggle, whereby the user is enabled to see the outside view immediately upon occurrence of any emergency and to be ready for adequate measures.

The shield is composed of black-and-white LCD panels, and the outside view is rendered observable through the periphery of the displayed image by adjusting the light transmissivity of the shield, so that the user is enabled to see the outside view partially while watching the displayed image.

Furthermore, this modification is so contrived as to enable the user to see the outside view through the goggle also when any external sound change is detected, whereby the user is made ready for prompt measures in response to such sound change without the necessity of moving his head. In this second embodiment shown in FIGS. 6 through 8, an image display unit 101 is shaped into a goggle type structure where black-and-white panels 103 are disposed in portions of a goggle body 102 corresponding to lenses of ordinary spectacles, and a pair of stems 104 are connected to both sides of the goggle body 102. Earphones 105L, 105R are provided in the stems 104, and a cord 114a serving for control and power supply is drawn out from an adequate portion of the goggle body 102.

The black-and-white LCD panels 103 provided on the front of the goggle body 102 serve as a light shield to the outside and are capable of gradationally permitting passage of the external light therethrough in a range from complete transmission full to interception. The LCD panels 103 can be automatically adjusted from an opaque intercepting state to a transparent transmitting or open state by an adjuster means and an external factor as will be described in detail later.

The earphones 105L and 105R attached to the stems 104 are adapted to be inserted into the user's ears for hearing sound. And an additional switching means may also be provided for hearing external sound automatically upon occurrence of any emergency due to an external factor.

A remote controller 107 is connected to the fore end of the cord 114a drawn out from one end of the goggle body 102, and a terminal 115 for connection to a video tape recorder (VTR) or the like is provided at the fore end of another cord 114b drawn out from the remote controller 107.

The remote controller 107 has an emergency button 108, a transmissivity adjust button 109 and VTR control buttons 110, 111 on a major surface, a sound volume control 112 on one side, and further a hook 113 on a bottom for temporary setting at an adequate position.

Similar to the aforementioned first embodiment as shown in FIG. 2, the rear of the goggle body 102 is furnished with a back panel 9 in a manner to surround a frame 8a where an eye lens 8L is attached. And windows 10L, 10R are formed in the back panel 9 so that the user can see the outside view therethrough while watching the displayed image. Consequently, it is possible for the user to enjoy the displayed video image and simultaneously to see the outside view through the windows 10L and 10R via the black-and-white LCD panels 103 provided on the reverse side.

Figure 7:
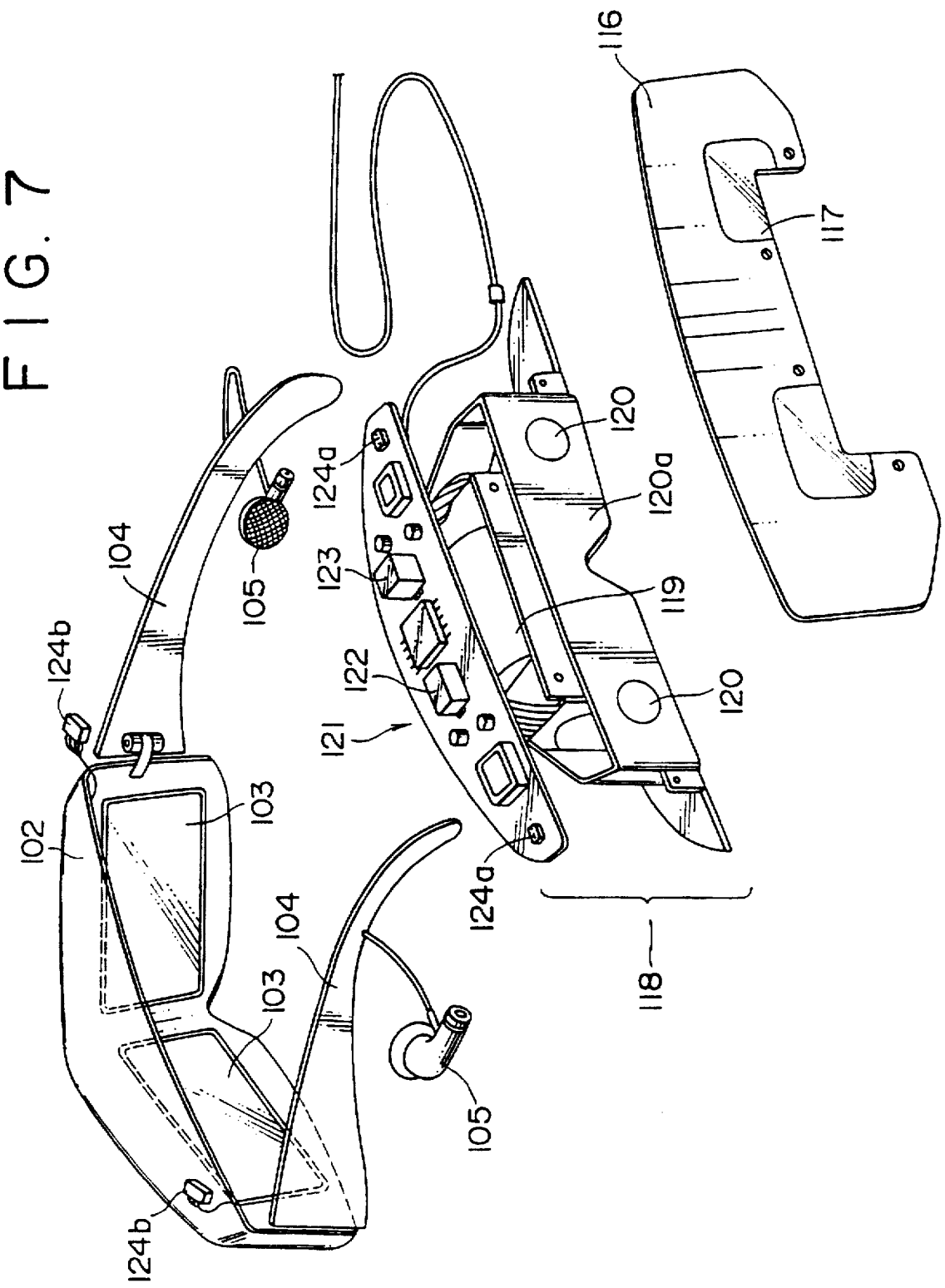
FIG. 7 schematically shows the internal structure of the image display unit in FIG. 6.

In the goggle body 102, there is housed an image assembly 118 as shown in FIG. 7. The image assembly 118 incorporates a back light 119 for image display with liquid crystal, two LCD panels for left and right eyes, and an optical mechanism, so that a displayed image can be seen directly through lenses 120.

In an upper portion of the image assembly 118, there is disposed an image display circuit 121 consisting of a printed circuit board and so forth where a multiplicity of electronic parts are mounted for controlling the LCD panels and the optical mechanism. The printed circuit board of the image display circuit 121 includes a vertical shock sensor 122 for detecting any upward or downward abrupt motion of the user's head, a horizontal shock sensor 123 for detecting any leftward or rightward abrupt motion of the head, and connectors 124a disposed on both sides for electrically connecting such sensors to a power source and supplying signals and power to the black-and-white LCD panels 103. The connectors 124a are coupled to another pair of connectors 124b drawn out from the black-and-white panels 103 of the goggle body 102.

Figure 8:
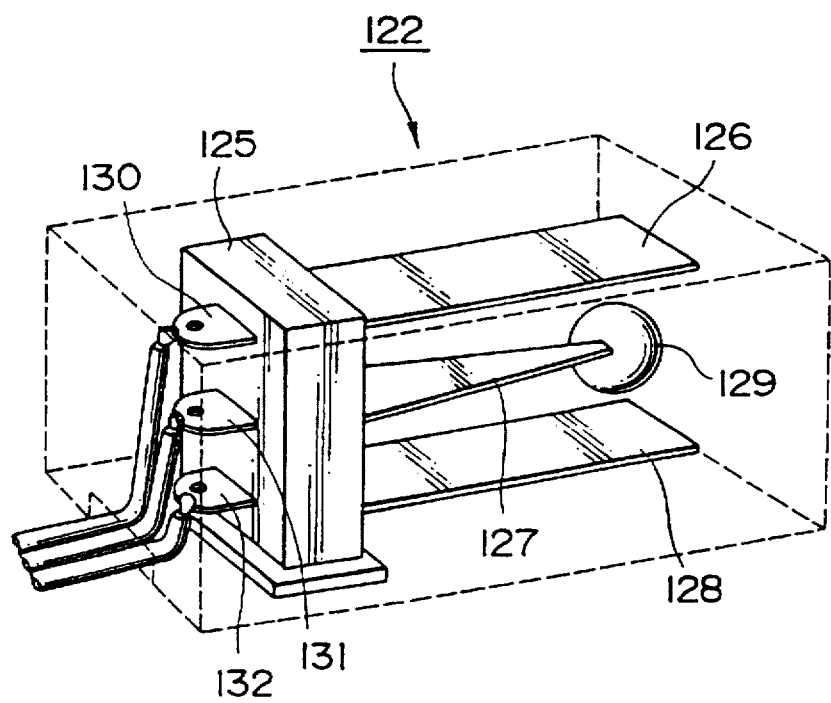
FIG. 8 illustrates an exemplary shock sensor employed in the structure of FIG. 7.

As illustrated in FIG. 8, the vertical shock sensor 122 comprises three conductive plates, i.e., an upper plate 126, a center plate 127 and a lower plate 128 which are arranged at proper intervals and are fixed to a holder 125 at the respective base ends. A metallic ball 129 serving as a weight is attached to the fore end of the center plate 127, and the respective base ends of the three plates supported by the holder 125 project therefrom to form connecting terminals 130, 131, 132. Normally the terminal 131 is used as a common terminal, the terminal 130 as a signal terminal for detecting a downward shock, and the terminal 132 is used as a signal terminal for detecting an upward shock.

In such arrangement, normally the center plate 127 is retained substantially at the center between the upper plate 126 and the lower plate 128. And in response to any abrupt motion or shock, the ball 129 is inertially displaced and brought into contact with the upper plate 126 or the lower plate 128, so that a current comes to flow therethrough, and consequently the upward or downward shock is detected. The operation of the horizontal shock sensor 123 is the same in principle as that of the vertical shock sensor 122 except the mere difference relative to the direction of its attachment. Therefore a detailed explanation of the horizontal shock sensor 123 is omitted here.

The image display unit equipped with such vertical shock sensor 122 and horizontal shock sensor 123 is worn on the user's face similarly to ordinary spectacles, and in a state where the display unit is shielded either entirely or partially from the outside view, the user is enabled to watch a video image on the LCD panels while hearing the sound thereof by the earphones 105L, 105R.

If the user shakes his head abruptly or an external shock is exerted in the state mentioned above, such shake or shock is detected and then the black-and-white LCD panels 103 are opened to be transparent, whereby the user is enabled to see the outside view immediately. The light transmissivity of the LCD panels relative to the outside view can be adequately changed by means of the remote controller 107.

As described hereinabove, the improved image display unit in the system of the present invention has, in a portion other than the LCD panels, a light shield to intercept the outside view, and predetermined sensors are provided for detecting any abrupt motion of a user or any external shock or sound, so that the shield is opened immediately in response to the detection and thereby enables the user to see the outside view. Therefore, even though the image display unit is shaped into a goggle type, there is achievable a superior effect that enables the user to see the outside view immediately upon occurrence of any abnormal or urgent state in the outside to thereby promptly take necessary measures.

Furthermore, the shield is composed of black-and-white LCD panels, and the light transmissivity thereof can be adjusted for properly seeing the outside view through the periphery of the displayed video image, so that complete disappearance of the vision is never induced, and the user can see the outside view as desired while watching the displayed image.

What is claimed is:

1. An image display system for flickerless stereoscopic reproduction of a visual scene, comprising:

MOS FET image display means incorporated into a frame adapted for wearing on a user's head and having right and left LCD panels each starting operation thereof in response to a start pulse received at every vertical field of an input video signal, said LCD panels receiving respective right and left video image data, said LCD panels being of a continuous-display type not incorporating write/hold terminals;

a source for providing said input video signal to said image display means representing right and left stereoscopic video field images to the right and left eyes, respectively, of said user;

start pulse generating means incorporated into the frame for generating right and left start pulses in synchronism with the arrival of said right and left video image data representing the right and left stereoscopic video field images, respectively, said start pulses being mutually in an opposite-phase relationship; and means for respectively driving said right and left LCD panels by said right and left start pulses so that, during a given field interval, a right field proper to said given field interval is presented to said right eye and a held-over left field proper to a field interval immediately preceding said given field interval is simultaneously presented to said left eye; and, during a field interval immediately following said given field interval, a held-over right field proper to said given field interval is presented to said right eye and a left field proper to a field interval immediately is presented to said left eye, whereby the user perceives a flickerless stereoscopic image.

2. The image display system according to claim 1, wherein said start pulse generating means consists of a circuit to discriminate between odd and even fields of the stereoscopic video field images.

3. The image display system according to claim 1, wherein said LCD panels are of an active-matrix display type.

4. The image display system according to claim 1, wherein said right and left start pulses serve to refresh or reset said LCD panels.

5. The image display system according to claim 1, wherein the frame of said image display means comprises means for enabling the user to selectively and simultaneously view the surroundings outside of said image display means and the image displayed on said right and left LCD panels, so that the video signal displayed on said right and left LCD panels and said outside view can be selectively seen.

6. The image display system according to claim 5, wherein said frame further comprises shock detection means for detecting vertical or horizontal movement, and the video signal and said outside view are automatically switched in response to an output of said detection means.

7. The image display system according to claim 5, wherein said means for enabling the user to see said outside view comprises a third LCD panel which can be gradationally adjusted between an opaque state and a transparent state by a control voltage fed to said third LCD panel.

* * * * *